United States Patent [19]

Uematsu

[11] Patent Number: 4,862,194
[45] Date of Patent: Aug. 29, 1989

[54] LABEL PRINTER HAVING BOTH IMAGE AND CHARACTER DATA PRINTING MEANS

[75] Inventor: Kaoru Uematsu, Shizuoka, Japan
[73] Assignee: Tokyo Electric Co., Ltd., Tokyo, Japan
[21] Appl. No.: 130,629
[22] Filed: Dec. 8, 1987
[30] Foreign Application Priority Data

Dec. 9, 1986 [JP] Japan .................... 61-292783

[51] Int. Cl.⁴ .................................. G01D 15/10
[52] U.S. Cl. .................... 346/76 PH; 400/120; 400/121
[58] Field of Search .......... 400/120 PH, 121; 346/76 PH

[56] References Cited

U.S. PATENT DOCUMENTS 4,254,409 3/1981 Busby .
4,707,153 11/1987 Nishi et al. .................... 400/121

FOREIGN PATENT DOCUMENTS 0155973 9/1983 Japan .................... 400/120

Primary Examiner—E. A. Goldberg
Assistant Examiner—Huan H. Tran
Attorney, Agent, or Firm—Oblon, Spivak, McClelland, Maier & Neustadt

[57] ABSTRACT

The present invention provides a label printer which enables a large amount of information to be printed on a label without being restricted by the memory capacity of an image buffer by printing such information on the label by several successive printing operations. In the label printer, in case the amount of information to be printed on a label exceeds the memory capacity of the image buffer, printing picture image data are divided into several blocks having arbitrary amounts of data and are produced in the image buffer. Every time, a picture image is formed on the label in accordance with the printing picture image data.

11 Claims, 5 Drawing Sheets

LABEL PRINTER HAVING BOTH IMAGE AND CHARACTER DATA PRINTING MEANS

FIELD OF THE INVENTION

FIELD OF THE INVENTION AND RELATED ART STATEMENT

This invention relates to a printer which prints stored contents of a memory on a record medium, and more particularly to a label printer which prints stored contents of a memory on a label which is employed as a record medium.

Conventionally, there exists a printer called label printer which prints predetermined matters on a label and issues the label. Normally, a label on which predetermined matters are printed by such a label printer is applied, as its principal object, to a commodity and indicates information of the commodity. Meanwhile, contents to be printed on a label may include a name, weight, price or unit price with respect to a commodity to which the label is to be applied or coded bars representing information of the commodity. Accordingly, a label printer which can print such matters as listed above on a label is commonly connected to a computer to which an electronic weighing instrument is connected.

Meanwhile, various information of matters to be printed on a label is transmitted from a computer to a label printer to which the computer is connected. Thus, the label printer waits printing information to be transmitted thereto and stores printing picture image data for a single label into an image buffer provided in the label printer whereafter the label printer transfers stored contents of the image buffer to a thermal head in order to print such stored contents on a label.

Drawbacks of such prior art devices as described above will be described below. Since printing on a label involves transfer of stored contents of an image buffer to a thermal head, the amount of information which can be printed on a single label is restricted by the memory capacity of the image buffer. Accordingly, an amount of information greater than the memory capacity cannot be printed on a single label. Thus, if the memory capacity of the image buffer increases, the amount of information which can be printed on a single label also increases. However, the actual state is such that matters to be printed on a label are not so much including a name of a commodity, a weight, a price, a unit price, coded bars and some other incidental matters. Therefore, where the memory capacity of the image buffer is too large, the image buffer may have a useless area which is not used in normal use, contrary to a request for reduction in cost. Thus, in a normal case, the memory capacity of an image buffer is determined from an amount of information which is estimated as a maximum amount of information to be printed on a label. Accordingly, there is a drawback that the possibility that an amount of information greater than the memory capacity of such an image buffer may be printed is given up and accordingly an amount of information beyond the memory capacity of the image buffer cannot be printed at all.

However, in a field of ordinary printers other than label printers, a printer wherein printing information stored in an image buffer is exchanged for each print line is already known as disclosed, for example, in U.S. Pat. No. 4,254,409. With a printer of the type mentioned just above, a large amount of information can be printed with an image buffer of a small memory capacity. In other words, an amount of information greater than the memory capacity of the image buffer can be printed. However, it is a drawback that too much time is required until information to be printed is actually printed in its entirety because the image buffer is updated for each print line.

OBJECTS AND SUMMARY OF THE INVENTION

It is a first object of the present invention to provide a label printer which can print an amount of information greater than the memory capacity of an image buffer therein.

It is a second object of the present invention to provide a label printer wherein the quality of a print is not deteriorated.

In order to attain the objects, according to the present invention, there is provided a label printer which comprises a printing information storage area for storing therein printing data which are inputted from outside and are to be printed on a label, an image buffer for storing therein printing picture image data representative of a picture image which is the same as a picture image to be printed on the label, a printing picture image data producing means for producing, in the image buffer from which stored contents have been erased, printing picture image data from printing data stored in the printing information storage area, a printing means operable upon production of printing picture image data in the image buffer for printing on the label by means of a printing station printing picture image data only at a printing picture image data producing portion of the whole memory capacity of the image buffer, a judging means operable after printing on the label by the printing means for judging whether or not there remains any printing data in the printing information storage area, and an erasing means operable when the judging means judges that there remains some printing data in the printing information storage area for erasing the printing picture image data produced in the image buffer. Accordingly, even if printing picture image data as a whole exceed the memory capacity of the image buffer, they are divided into several blocks and such blocks of printing picture image data are stored one after another into the image buffer and thus printed for each block.

DESCRIPTION OF THE PREFERRED EMBODIMENT

Figure 1:
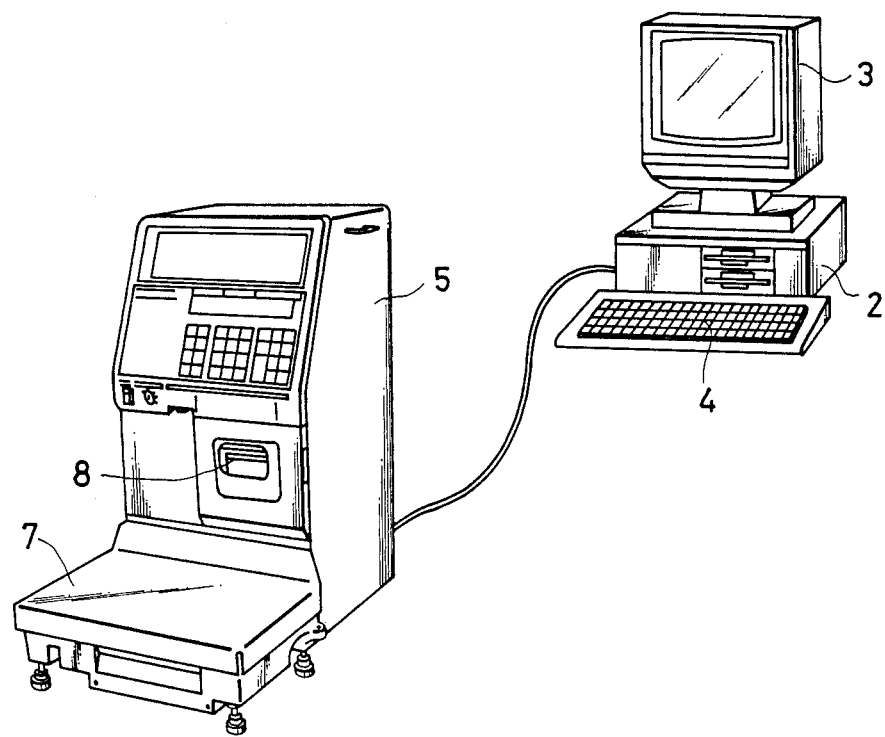
FIG. 1 is a perspective view of a system construction of a label printer connected to a host computer showing a preferred embodiment of the present invention.

Now, an embodiment of the present invention will be described with reference to FIGS. 1 to 7. FIG. 1 shows a general appearance of a weighing system including a label printer 1. In particular, the label printer 1 is connected to a host computer 2 to which a display 3 and a keyboard 4 are connected. The label printer 1 is united with a weighing instrument 6 and located in a common housing 5. A scale plate 7 of the weighing instrument 6 is disposed at a lower location of the housing 5. A label issuing port 8 which is part of the label printer 1 is disposed at a location of the housing 5 above the scale plate 7.

Figure 2:
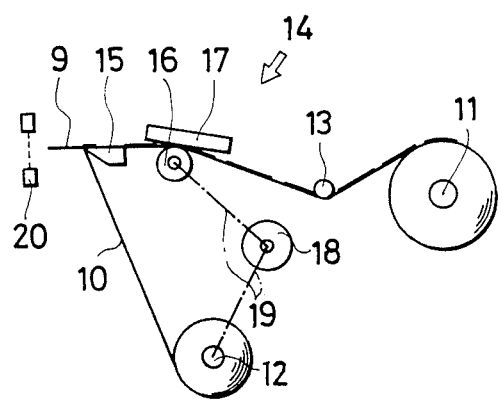
FIG. 2 is a side elevational view illustrating a process of and a structure for transporting a label.

Here, a mechanical structure within the label printer 1 will be described with reference to a schematic illustration of FIG. 2. A web of ground paper 10 to which labels 9 are applied is wrapped and held adjacent one end thereof around and on a supply shaft 11 and is taken up adjacent the other end thereof around a take-up shaft 12. A tension roller 13, a printing station 14 and a label exfoliating plate 15 are located in this order between the supply shaft 11 and the take-up shaft 12. The printing station 14 includes a rotatable platen 16, and a thermal head 17 adapted to be pressed against the platen 16 with the ground paper 10 interposed therebetween. Naturally, the thermal head 17 is located adjacent a face of the ground paper 10 on which the labels 9 are located. The tension roller 13 is a rotatable roller which is held at a location at which it can apply tension to the ground paper 10 between the supply shaft 11 and the platen 16. The label exfoliating plate 15 is located directly before the label issuing port 8 and has a shape adapted to bend the ground paper 10 between the printing station 14 and the take-up shaft 12 at an acute angle in order to cause a label 9 to be exfoliated from the ground paper 10.

A stepping motor 18 is located in the label printer 1, and the power of the stepping motor 18 is transmitted to the platen 16 and the take-up shaft 12 by way of a power transmitting mechanism 19. Here, the power transmitting mechanism 19 transmits the power of the stepping motor 18 such that the circumferential speed of the ground paper 10 wrapped in a roll around the take-up shaft 12 may always be higher than the circumferential speed of the platen 16. This is intended to always provide tension to the ground paper 10 after passing the platen 16 in order for a label 9 to be smoothly exfoliated from the ground paper 10. Here, for the take-up shaft 12, the power transmitting mechanism 19 is constructed such that it may yield a slip in transmission of power to the take-up shaft 12 owing to a frictional force between the printing station 14 and the ground paper 10. This is intended to prevent a possible slip between the printing station 14 and the ground paper 10.

Located above and below the label issuing port 8 are two components of a label detector 20 which is provided for detecting passage of a label 9 exfoliated from the ground paper 10 by the label exfoliating plate 15.

Figure 3:
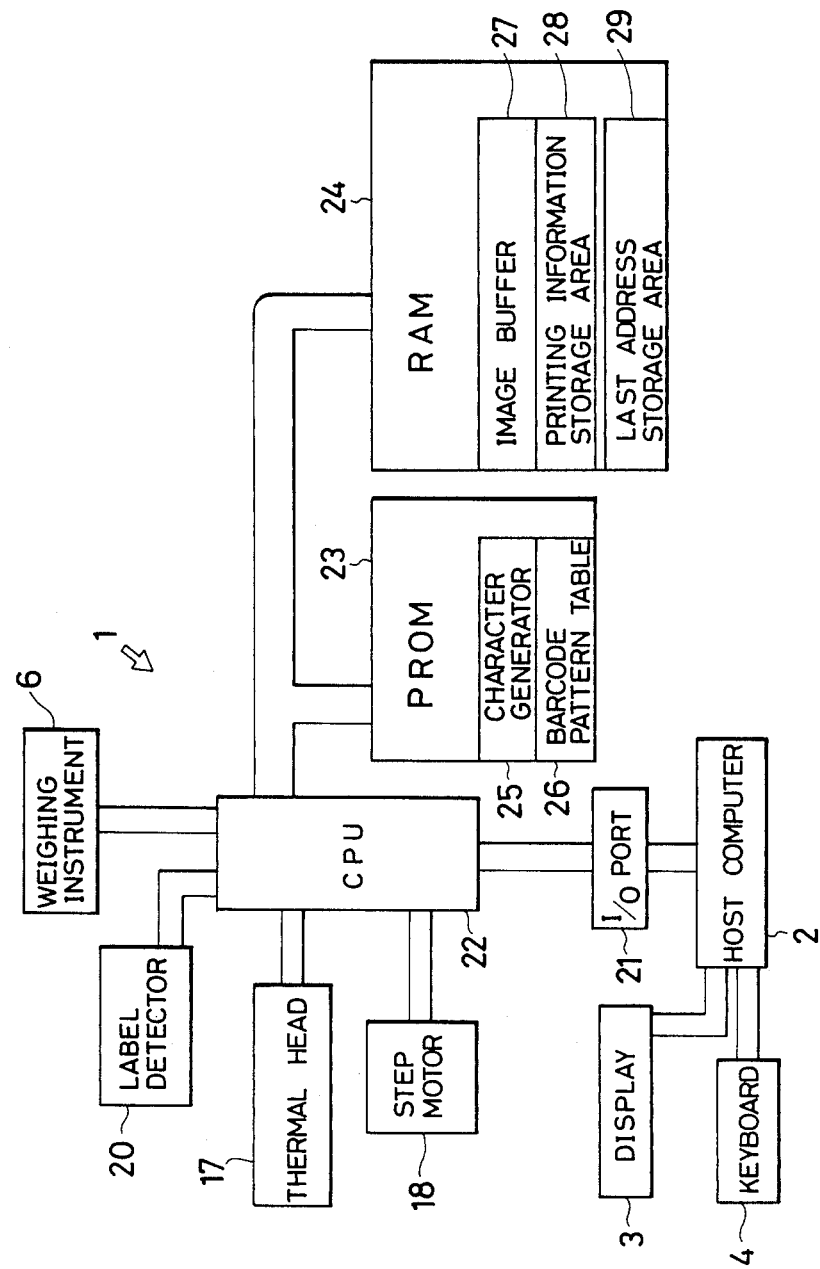
FIG. 3 is a block circuit diagram.

Now, electric connection of the various components of the label printer 1 will be described with reference to FIG. 3. At first, the display 3 and the keyboard 4 are connected to the host computer 2 to which a central processing unit (CPU) 22 of the label printer 1 is connected via an input/output (I/O) port 21. The thermal head 17, stepping motor 18 and label detector 20 are connected to the CPU 22. A programmable read-only memory (PROM) 23 and a random access memory (RAM) 24 are also connected to the CPU 22 as its memories. The PROM 23 may be an erasable programmable read-only member (EPROM) wherein internal stored contents can be rewritten by ultraviolet rays or an electrically alterable ROM (EAROM) wherein internal stored contents can be electrically altered. The PROM 23 has basic operating principles for the various components reloadably stored therein and includes a character generator 25 and a bar code pattern table 26 therein. The RAM 24 is a freely reloadable memory and includes an image buffer 27, a printing information storage area 28 and a last address storage area 29 therein.

Now, basic operations of the individual components of the label printer having such a construction as described above when a label 9 is to be issued will be described. At first, the stepping motor 18 is rendered operative, and thereupon the power of the stepping motor 18 is transmitted to the platen 16 and the take-up shaft 12 by way of the power transmitting mechanism 19. Consequently, the ground paper 10 is fed by the platen 10 to transport a label 9 applied to the ground paper 12. During such transportation of the label 9, predetermined matters are printed on the label 9 by the thermal head 17. Contents to be printed on the label 9 are derived from information transmitted to the label printer 1 from the host computer 2 via the I/O port 21. In the label printer 1, the information transmitted from the host computer 2 is once stored into the printing information storage area 28 of the RAM 24. Such information before it is stored into the printing information storage area 28 is defined here as printing data. In response to such printing data and in accordance with an instruction from the CPU 22, a predetermined character pattern or patterns are fetched from the character generator 25 within the PROM 23 and/or a predetermined bar code pattern or patterns are fetched from the bar code pattern table 26. Such fetched patterns are loaded into the image buffer 27. Contents of the image buffer 27 loaded in this manner are defined here as printing picture image data. Such printing picture image data produced in the image buffer 27 are then transferred to the thermal head 17 in accordance with an instruction from the CPU 22 while at the same time the ground paper 10 is fed by the stepping motor 18. Consequently, a picture image based on the printing picture image data is printed on the label 9 being fed in this manner. Then, when the label 9 after printing is transported further, the ground paper 10 is bent acutely at a portion thereof at the label exfoliating plate 15 so that it is exfoliated from the ground paper 10 at the location. Then, the label 9 exfoliated is issued from the label issuing port 8 whereupon an end of the label 9 is detected by the label detector 20. Consequently, issuing of the label 9 is discriminated.

Figure 4:
FIG. 4 is a front elevational view of an example of label printed by the label printer.
Figure 5:
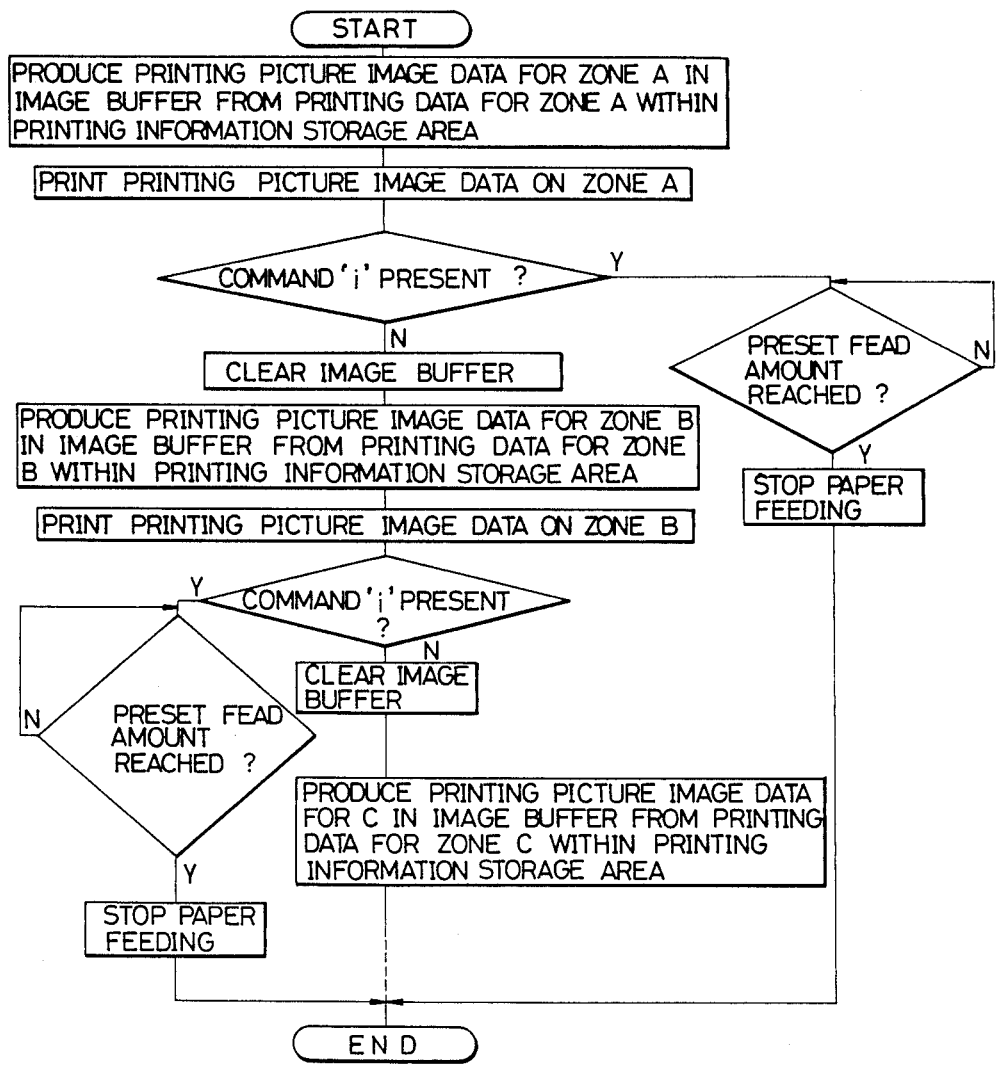
FIG. 5 is a flow chart.

Now, an example of such label 9 issued with predetermined matters printed thereon will be described with reference to FIG. 4. Here, it is assumed that an area of the label 9 as provided by a multiplication of (1) and ($\alpha$) in FIG. 4 represents the storage capacity of the image buffer 27.

Figure 6:
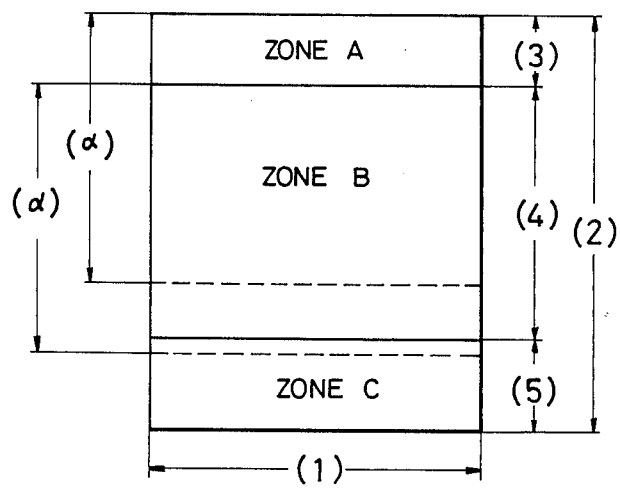
FIG. 6 is a plan view showing a relation between the size of a label and contents of a print.

On the other hand, according to the present invention, even if the amount of information to be printed on a label 9, that is, printing data stored in the printing information storage area 28 exceed the memory capacity of the image buffer 27, a picture image can be printed on the label in accordance with the entire printing data. Thus, how printing picture image data of the image buffer 27 are produced from printing data stored in the printing information storage area 28 and how printing is effected on a label 9 in accordance with the printing picture image data will now be described with reference to a flow chart of FIG. 5. Here, description will be given of a case as an example wherein printing is to be made on a label 9 having such a size as shown in FIG. 6. In particular, (1) denotes a width of the label 9, and (2) a length of the label 9. Meanwhile, also in the case of FIG. 6, similarly as in the label 9 shown in FIG. 4, the memory capacity of the image buffer 27 corresponds to an area defined by (1) and (α). In this instance, the label 9 is hypothetically divided into three zones including a zone A of the area of [(1)×(3)], a second zone B of the area of [(1)×(4)] and a third zone C of the area of [(1)×(4)]. Thus, a series of commands with which the zones A, B and C are successively coupled to the image buffer 27 are set into the host computer 2 by way of key input of the keyboard 4. In particular, commands as listed in Table 1 are set.

TABLE 1

| ESC | r | ~ | Printing Data for Zone A | ~ | LF | NUL |
|-----|---|----|--------------------------|---|----|-----|
| ESC | is | LF | NUL |   |    |     |
| ESC | C | LF | NUL |   |    |     |
| ESC | r | ~ | Printing Data For Zone B | ~ | LF | NUL |
| ESC | is | LF | NUL |   |    |     |
| ESC | C | LF | NUL |   |    |     |
| ESC | r | ~ | Printing Data for Zone C | ~ | LF | NUL |
| ESC | i | LF | NUL |   |    |     |

Here, 'Printing Data for Zone A, Zone B or Zone C' denotes printing data for the zone A, zone B or zone C of a label 9, respectively.

'ESC' is a symbol which represents that a command will follow the same.

'r' is a symbol which represents that printing picture image data are to be subsequently produced in the image buffer from printing data.

'LF' is a symbol which represents, in contrast to 'r', that production of printing picture image data is completed.

'NUL' is a symbol which represents, in contrast to 'ESC', that the command is completed.

'is' and 'i' are commands for judgment: 'is' is a symbol which represents that there remain some printing data within the printing information storage area 28 while 'i' is a symbol which represents that there remains no printing data in the printing information storage area 28.

Further 'C' is a symbol which represents that stored contents of the image buffer 27 are to be cleared.

On the premise given above, following operations are conducted. At first, the commands listed in Table 1 are transmitted from the host computer 2 and stored into the printing information storage area 28 within the label printer 1. After then, the commands listed in Table 1 are executed as they are. In particular, in accordance with a following command ESC r~Printing Data for Zone A~LF NUL printing picture image data for the zone A are produced in the image buffer 27 from the printing data for the zone A stored in the printing information storage area 28. In this instance, it is premised that stored contents of the image buffer 27 have been erased in advance. Production of printing picture image data proceeds such that, in response to printing data, a predetermined character pattern or patterns are fetched from the character generator 25 and/or a predetermined bar code pattern or patterns are fetched from the bar code pattern table 26, and such pattern or patterns are loaded into the image buffer 27 as described hereinabove.

Thus, an operation controlling program within the PROM 23 for causing such a producing operation, the PROM 23 and the RAM 24 themselves, the CPU 22 and some other elements constitute a printing picture image data producing means.

In this instance, printing picture image data are successively set into individual addresses of the image buffer 27, and the number of an address which is designated as the last address among such addresses of the image buffer 27 is stored into the last address storage area 29 of the RAM 24.

Subsequently, after production of printing picture image data for the zone A in the image buffer 27, a picture image is printed on a label 9 in accordance with the printing picture image data for the zone A. As described above, such printing is effected by delivering the printing picture image data to the thermal head 17. In this instance, the printing picture image data in the addresses only to the address designated by the address number stored in the last address storage area 29 are printed on the label 9. In other words, at a portion corresponding to the last address, or more particularly at a boundary portion between the zones A and B, printing operation and transporting operation for the label 9 are stopped. Thus, an operation controlling program within the PROM 23 for causing such a printing operation, the CPU 22, printing station 14, stepping motor 18 and some other components constitute a printing means.

Subsequently, it is judged whether or not the label 9 is completed. This is effected by judging whether or not there remains printing data within the printing information storage area 28. Such judgment is made in accordance with the command for judgment 'is' or 'i'. In the case of Table 1, a following command ESC is LF NUL is present at the next position. Accordingly, there still remain printing data within the printing information storage area 28. In other words, it is found out that the label 9 is not yet completed. Thus, an operation controlling program within the PROM 23 for causing such a judging operation, the PROM 23, RAM 24 and some other elements constitute a judging means.

It is to be noted here that if there is a following command

ESC i LF NUL then it is judged that the label 9 is completed, and then an operation for issuing the label 9 described above will be performed. Then, if an end of the label 9 is detected by the label detector 20, it is found out that the feed mount of the label 9 reaches a preset feed amount, and therefore feeding of the ground paper 10 is stopped.

Then, in case it is judged by the judging means that the label 9 is not yet completed, stored contents of the image buffer 27, that is, printing picture image data for the zone A are cleared by a following command

ESC C LF NUL

Thus, an operation controlling program within the PROM 23 for causing such an erasing operation, the PROM 23 and RAM 24 themselves, the CPU 22 and some other elements constitute an erasing means.

Then, a following sequence of commands

ESC r~Printing Data for Zone B~LF NUL
ESC is LF NUL
ESC C LF NUL are executed in order to print a picture image on the label 9 in accordance with printing picture image data for the zone B. Such a sequence of operations are similar to those operations as described above for printing a picture image on the label 9 in accordance with the printing picture image data for the zone A except that contents to be printed are different. It is to be noted that since in this instance transportation has been stopped at the boundary portion between the zones A and B, printing operation is resumed at the beginning of the zone B as the label 9 is transported again. Then, at a boundary portion between the zones B and C, printing operation and transportation of the label are stopped.

Then, following commands

ESC r~Printing Data for Zone C~LF NUL

Figure 7:
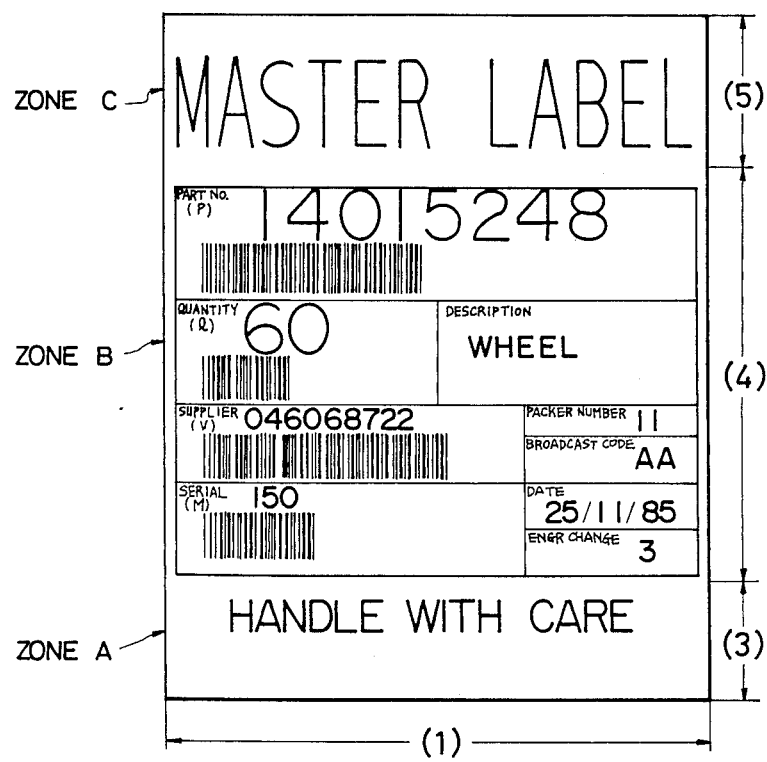
FIG. 7 is a front elevational view showing another example of label printed by the label printer.

ESC i LF NUL are executed in order to print a picture image on the label 9 in accordance with printing picture image data for the zone C. Since in this instance transportation has been stopped at the boundary portion between the zones B and C, printing operation is resumed at the beginning of the zone C as the label 9 is transported again. Since a following command ESC i LF NUL for judgment follows, it is found out that the label 9 has been completed, and an operation for issuing the label 9 described above is performed subsequently. FIG. 7 shows an example of label 9 which is issued in this manner with predetermined matters printed thereon.

In this manner, even if the image buffer 27 only has a memory capacity corresponding to an area of a portion presented by a multiplication of (α) and (1), printing can be made over a greater area, for example, an area presented by a multiplication of (1) and (2) on a label 9. Accordingly, an economical disadvantage involved in use of an image buffer having a large memory capacity can be eliminated.

It is to be noted that where contents to be printed are greater in amount and must be divided into a greater number of zones A, B, C, D . . . , a similar sequence of operations to that described above will be repeated by the number of times corresponding to the number of the divided zones. Further, the size or sizes of the areas of the divided portions can be set freely so far as it does not exceed the memory capacity of the image buffer 27.

However, for a normal label 9 such as the label 9 shown in FIG. 4 the area of which is equal to or smaller than the memory capacity of the image buffer 27, printing is naturally effected at a stretch without making use of the divisional printing method described above. In particular, printing picture image data are produced collectively in the image buffer 27 from printing data stored in the printing information storage area 28. In this instance, since a transporting operation for a single label 9 is not interrupted during transportation of the label 9, the time required for such printing and issuing of the label 9 is reduced.

Further, in the present embodiment, contents to be printed are divided into the zones A, B and C. As apparently seen in FIG. 7, no dots are printed by the thermal head 17 for several print lines around a boundary portion between adjacent zones, and such print lines provide a blank area. This means that the thermal head 17 generates less heat at such boundary portions between adjacent ones of the zones A, B and C. Accordingly, even if transportation of the label 9 is stopped at any of such boundary portions between the zones A and B and between the zones B and C, such an accident will not occur that a line is drawn at a location of a boundary portion of the label due to residual heat of the thermal head 17. In fact, if transportation of the label 9 is stopped at a mid portion during formation of a character or a figure, a line may be drawn at the mid portion of the label because the thermal head 17 has generated heat at a predetermined level till then. To the contrary, in case transportation of the label 9 is stopped at a blank portion of the label 9 at which no character nor figure is to be drawn, the level of heat generation of the thermal head 17 is lowered during feeding of the blank portion of the label 9 so that no line will be drawn at a portion of the label 9 at which transportation of the label 9 is stopped. Accordingly, deterioration in quality of a print can be prevented.

In addition, in a device which employs a reloadable PROM as a memory, only if the PROM is reloaded using an existing device, printing over an area which exceeds the memory capacity of an image buffer can be made on a label.

It is to be noted that, in working the present invention, feeding operation of a label 9 relative to the thermal head 17 may not be stopped each time a printing picture image formed divisionally in the image buffer 27 is to be subsequently printed. For example, an alternative method can be employed wherein each time printing for a print line is performed by the thermal head 17, a printing picture image for the line just printed is erased from the image buffer 27 and then printing picture image data for several print lines are shifted one after another within the image buffer 27 whereafter printing picture image data for a printing picture image for a new print line is set into the image buffer 27 for the last print line. With the alternative method, a single label 9 can be completed at a stretch without stopping feeding of the label 9.

What is claimed is:

1. A label printer, comprising:
   a printing information storage area for storing therein printing data which is inputted from outside and are to be printed on a portion of a label;
   an image buffer for storing therein printing picture image data representative of a picture image which is the same as a picture image to be printed on the label;
   a printing picture image data producing means for producing, in said image buffer from which stored contents have been erased, printing picture image data from printing data stored in said printing information storage area;
   a printing means operable upon production of printing picture image data in said image buffer for printing on the label by means of a printing station printing picture image data only at a printing picture image data producing portion of the whole memory capacity of said image buffer;
   a judging means operable after printing on the label by said printing means for judging whether or not there remains any printing data in said printing information storage area; and
   an erasing means operable when said judging means judges that there remains some printing data in said printing information storage area for erasing the printing picture image data produced in said image buffer.

2. A label printer according to claim 1, wherein said printing means includes a platen and a thermal head adapted to be pressed against said platen.

3. A label printer according to claim 2, wherein an elongated ground paper to which labels are applied is fed by a turning force of said platen.

4. A label printer according to claim 1, wherein a printing picture image is divided at a portion of a label around which no character nor figure is to be printed for several print lines.

5. A label printer according to claim 1, wherein a printing picture image data dividing means is provided within a RAM which is provided for storing therein data to be freely rewritten.

6. A label printer according to claim 5, wherein said label printer is connected to a host computer so that stored contents of said RAM may be rewritten by an inputting operation by way of a keyboard of said host computer.

7. A label printer according to claim 5, wherein said image buffer is built in said RAM.

8. A label printer according to claim 1, wherein a judging command for judging whether or not there remains any data for a printing picture image is provided as a printing picture image data detecting means in order to judge whether or not a whole picture is completed.

9. A label printer according to claim 1, wherein a ROM for controlling basic operations of the various components is a reloadable ROM.

10. A label printer according to claim 9, wherein an EPROM is employed as said PROM.

11. A label printer according to claim 9, wherein an EAROM is employed as said PROM.

* * * * *